(12) United States Patent
Andersson et al.

(10) Patent No.: US 8,939,510 B2
(45) Date of Patent: Jan. 27, 2015

(54) SEAT ASSEMBLY HAVING A COLLAPSIBLE CUSHION SUPPORT ASSEMBLY

(75) Inventors: Christer Andersson, Trollhattan (SE); Odd Jaegtnes, Nygard (SE)

(73) Assignee: Lear Corporation, Southfield, MI (US)

(*) Notice: Subject to any disclaimer, the term of this patent is extended or adjusted under 35 U.S.C. 154(b) by 25 days.

(21) Appl. No.: 13/616,708

(22) Filed: Sep. 14, 2012

(65) Prior Publication Data
US 2013/0088061 A1 Apr. 11, 2013

Related U.S. Application Data

(60) Provisional application No. 61/543,889, filed on Oct. 6, 2011.

(51) Int. Cl.
*B60N 2/48* (2006.01)
*B60N 2/70* (2006.01)
*A47C 4/04* (2006.01)
*B60N 2/30* (2006.01)
*B60N 2/36* (2006.01)

(52) U.S. Cl.
CPC ............... *B60N 2/7058* (2013.01); *A47C 4/04* (2013.01); *B60N 2/7094* (2013.01); *B60N 2/3065* (2013.01); *B60N 2/36* (2013.01); *B60N 2002/363* (2013.01)
USPC ...................... 297/378.12; 297/334; 297/341

(58) Field of Classification Search
USPC ............ 297/331, 334, 341, 378.12, 337, 340
See application file for complete search history.

(56) References Cited

U.S. PATENT DOCUMENTS

| 3,512,831 | A | * | 5/1970 | Hyland ......................... 297/309 |
| 4,377,279 | A | | 3/1983 | Schulz, Jr. et al. |
| 4,620,336 | A | * | 11/1986 | Miller ............................... 5/249 |
| 4,654,905 | A | | 4/1987 | Miller |
| 4,771,995 | A | | 9/1988 | Wells et al. |
| 5,052,064 | A | | 10/1991 | Hagemeister et al. |
| 5,346,188 | A | | 9/1994 | Rodgers et al. |
| 5,539,944 | A | | 7/1996 | Miller |
| 5,622,357 | A | | 4/1997 | Schulz, Jr. et al. |
| 5,765,240 | A | | 6/1998 | Workman |
| 6,012,190 | A | | 1/2000 | Rogers |
| 6,032,307 | A | | 3/2000 | Workman |
| 6,616,239 | B2 | | 9/2003 | Guillot |
| 6,676,218 | B2 | * | 1/2004 | Fujita et al. ............. 297/452.49 |
| 6,736,459 | B1 | | 5/2004 | Sturt |
| 6,860,561 | B2 | | 3/2005 | Takata |
| 6,874,840 | B2 | | 4/2005 | Neale |
| 7,100,989 | B2 | | 9/2006 | Andersson et al. |

(Continued)

FOREIGN PATENT DOCUMENTS

CN 1618655 A 5/2005
DE 102005054192 B4 5/2011

(Continued)

OTHER PUBLICATIONS

Chinese Patent and Trademark Office, First Office Action for the corresponding Chinese Patent Application No. 201210368040.2 mailed Sep. 26, 2014.

*Primary Examiner* — David R Dunn
*Assistant Examiner* — Jody Giacoman
(74) *Attorney, Agent, or Firm* — Brooks Kushman P.C.

(57) ABSTRACT

A seat assembly having a collapsible cushion support assembly disposed on a seat bottom frame and an adjustable support mechanism. The adjustable support mechanism supports a seat occupant and extends from a seat bottom frame to a seat back frame.

20 Claims, 6 Drawing Sheets

(56) References Cited

U.S. PATENT DOCUMENTS 7,367,625 B2* 5/2008 Mori et al. ............... 297/378.12
2006/0103214 A1* 5/2006 Andersson et al. ...... 297/378.13

FOREIGN PATENT DOCUMENTS

| EP | 0182944 | B1 | 8/1989 |
| EP | 0192890 | B1 | 4/1990 |

* cited by examiner

SEAT ASSEMBLY HAVING A COLLAPSIBLE CUSHION SUPPORT ASSEMBLY

CROSS-REFERENCE TO RELATED APPLICATIONS

This application claims the benefit of U.S. Provisional Application No. 61/543,889, filed Oct. 6, 2011, the disclosure of which is incorporated in its entirety by reference herein.

TECHNICAL FIELD

This application relates to a seat assembly having a collapsible cushion support assembly.

BACKGROUND

A collapsible cushion for integration into an automobile seat is disclosed in U.S. Pat. No. 7,100,989.

SUMMARY

In at least one embodiment, a seat assembly is provided. The seat assembly may include a seat bottom, a seat back, and an adjustable support mechanism. The seat bottom may include a cushion, a seat bottom frame, and a collapsible cushion support assembly. The collapsible cushion support assembly may be disposed on the seat bottom frame and may include a first plate, a second plate, and a set of spring members. The first plate may support the cushion. The second plate may be disposed proximate the seat bottom frame. The set of spring members may be disposed between and may be pivotally coupled to the first and second plates. The set of spring members may allow the collapsible cushion support assembly to move between an extended position and a collapsed position. The seat back may be configured to pivot with respect to the seat bottom and may have a seat back frame. The adjustable support mechanism may support the first plate and may extend from the seat bottom frame to the seat back frame.

In at least one embodiment, a seat assembly is provided. The seat assembly may include a seat bottom, a seat back, and an adjustable support mechanism. The seat bottom may include a cushion, a collapsible cushion support assembly, and a seat bottom frame. The seat bottom frame may include a seat pan, a mounting plate, and a connecting plate. The mounting plate may be adapted to be mounted to a support surface. The connecting plate may be pivotally coupled to the seat pan and the mounting plate. The collapsible cushion support assembly may be disposed on the seat pan and may include a first plate, a second plate, and a set of spring members. The first plate may be disposed proximate the cushion. The second plate may be coupled to the seat pan. The set of spring members may be disposed between and may be pivotally coupled to the first and second plates. The set of spring members may allow the collapsible cushion support assembly to move between an extended position and a collapsed position. The seat back may be configured to pivot about an axis of rotation with respect to the seat bottom. The seat back may have a seat back frame. The adjustable support mechanism may support the cushion and may extend from the seat pan to the seat back frame.

In at least one embodiment, a seat assembly is provided. The seat assembly may include a seat bottom, a seat back, and an adjustable support mechanism. The seat bottom may include a seat bottom frame and a collapsible cushion support assembly disposed on the seat bottom frame. The seat back may be configured to pivot with respect to the seat bottom and may include a seat back frame and a second collapsible cushion support assembly disposed on the seat back frame. The adjustable support mechanism may extend from the seat bottom frame to the seat back frame and may support the collapsible cushion support assembly. Tension on the adjustable support mechanism may increase when the seat back is pivoted away from the seat bottom.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
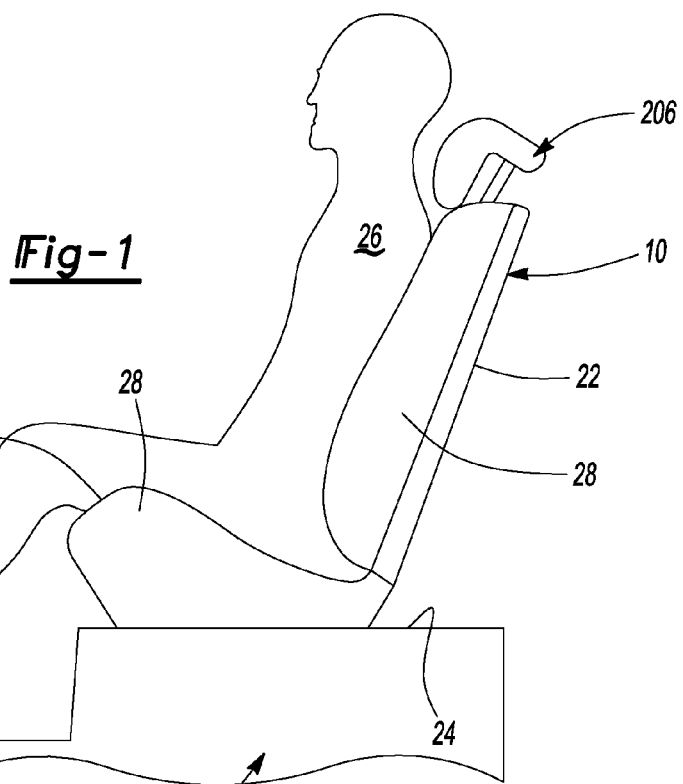
FIG. 1 is a side view of a seat assembly disposed in a vehicle.

Referring to FIG. 1, an exemplary seat assembly 10 is shown. The seat assembly 10 may be configured for use in a vehicle 12, such as a motor vehicle likfheade a car or truck. In addition, the seat assembly 10 may also be provided for non-vehicular applications.

Figure 9:
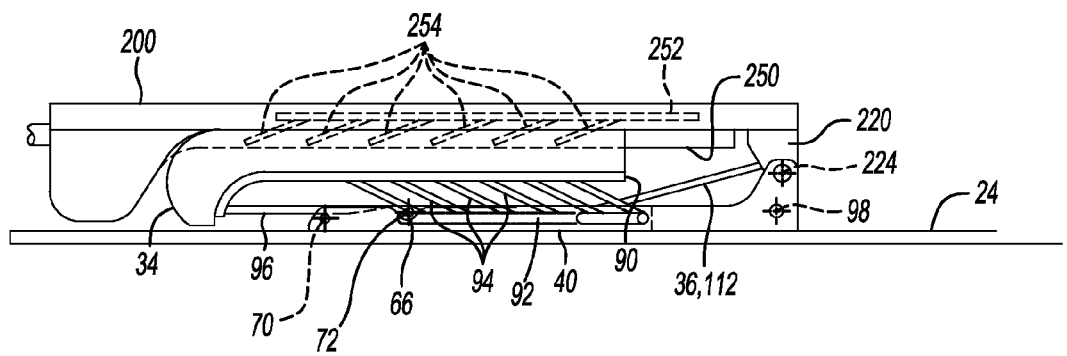

The seat assembly 10 may include a seat bottom 20 and a seat back 22. The seat bottom 20 may be configured to be mounted on a support surface 24, such as a floor pan of the vehicle 12. The seat back 22 may be pivotally disposed on the seat bottom 20 and may be configured to move between an unfolded position and a folded position. In the unfolded position, the seat back 22 may extend away from the seat bottom 20 such that a seat occupant 26 may be seated on the seat assembly 10. In the folded position, the seat back 22 may be folded over the seat bottom 20 and may not receive a seat occupant 26. Exemplary unfolded and folded positions are shown in FIGS. 1 and 9, respectively.

The seat bottom 20 and seat back 22 may each include a trim cover assembly 28. The trim cover assembly 28 may be made of any suitable material, such as fabric, leather, vinyl, or combinations thereof. Each trim cover assembly 28 may comprise at least a portion of an exterior surface of the seat assembly 10. As such, the trim cover assembly 28 may be contacted by a seat occupant 26.

Referring to FIGS. 2-5, the seat bottom 20 is shown in more detail. The seat bottom 20 may include a seat bottom frame 30, a collapsible cushion support assembly 32, a cushion 34, and an adjustable support mechanism 36.

Figure 5:
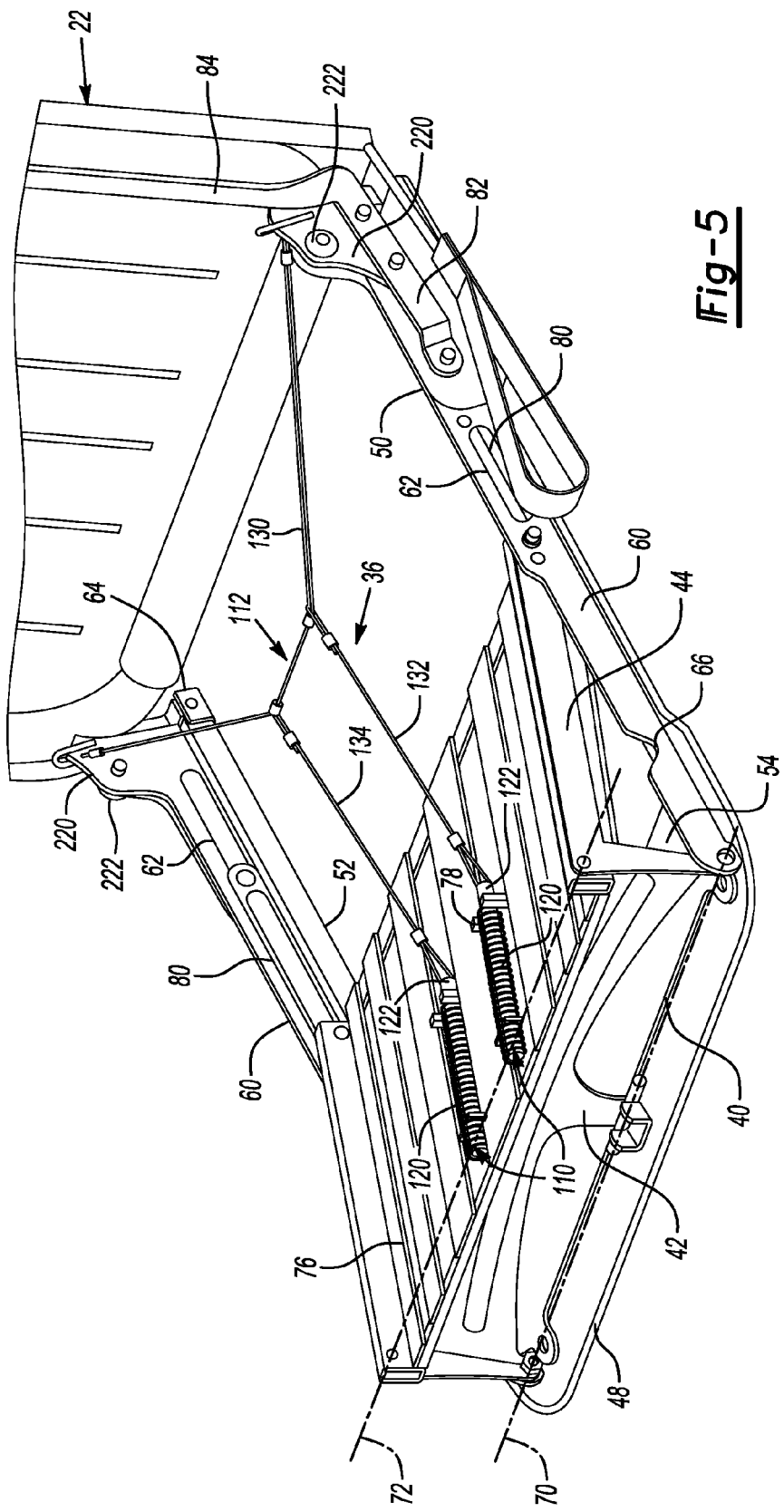
Figure 6:
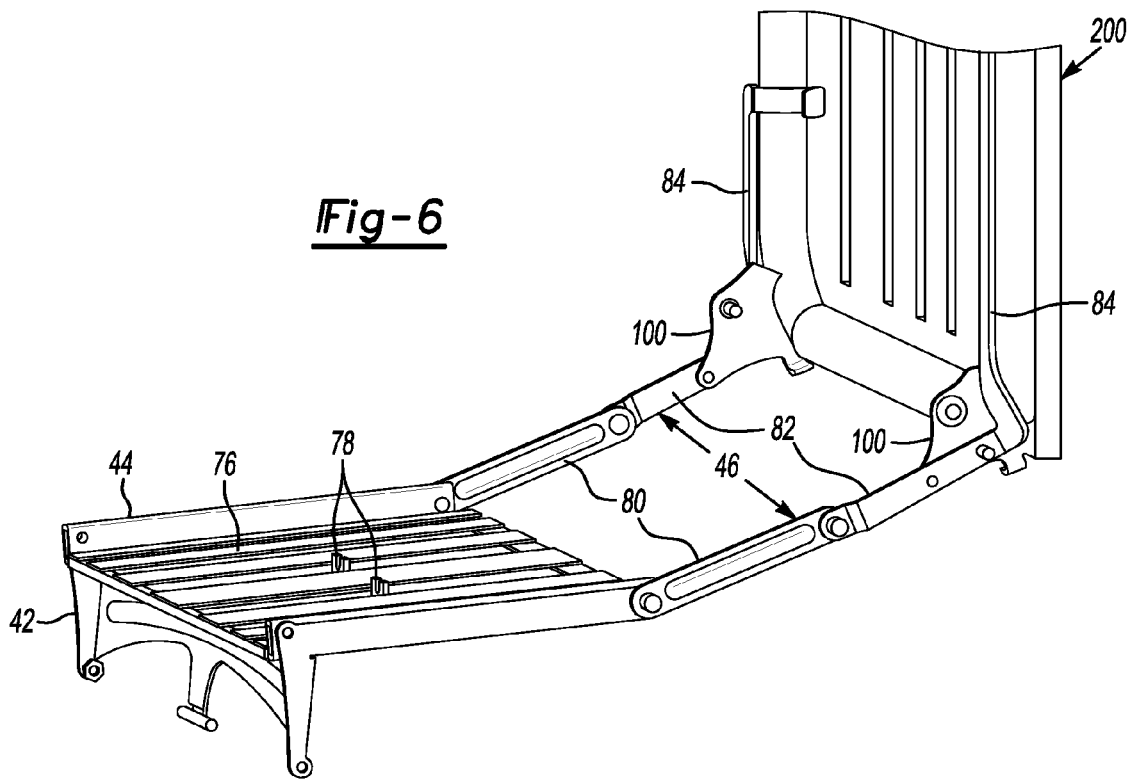

The seat bottom frame 30 may provide at least a portion of a support structure for the seat bottom 20. As is best shown in FIGS. 5 and 6, the seat bottom frame 30 may include a mounting plate 40, a connecting plate 42, a seat pan 44, a linkage mechanism 46, and a trim cover attachment member 48.

The mounting plate 40 may be configured to be mounted to the support surface 24. For example, the mounting plate 40 may include a plurality of holes that may receive fasteners, such as bolts, that may fixedly couple the mounting plate 40 to the support surface 24. The mounting plate 40 may have a generally U-shaped configuration and may include a first side portion 50, a second side portion 52, and a connecting portion 54. The connecting portion 54 may be disposed proximate a front end of the seat assembly 10.

The first and second side portions 50, 52 may be spaced apart and extend from the connecting portion 54 toward the seat back 22. The first and second side portions 50, 52 may have a generally L-shaped cross section and may include an upwardly extending flange 60. The flange 60 may include a guide slot 62 that controls movement of the linkage mechanism 46 as will be discussed in more detail below. The guide slot 62 may be substantially linear in one or more embodiments. The first and second side portions 50, 52 may also have a pivot frame mounting feature 64 and a notch 66. The pivot frame mounting features 64 may be disposed proximate an end of the first and second side portions 50, 52. The notch 66 may extend from a top of the flange 60 toward the bottom of the mounting plate 40.

The connecting plate 42 may extend between the mounting plate 40 and the seat pan 44. The connecting plate 42 may have a first end and a second end disposed opposite the first end. The connecting plate 42 may be rotatably coupled to the mounting plate 40 along a first rotation axis 70 that may be disposed proximate the first end. The connecting plate 42 may be rotatably coupled to the seat pan 44 along a second rotation axis 72 that may be disposed proximate the second end. The connecting plate 42 may be pivotally coupled to the mounting plate 40 and seat pan 44 in any suitable manner, such as with one or more pins.

The seat pan 44 may be configured to support the collapsible cushion support assembly 32. The seat pan 44 may have a first end and a second end disposed opposite the first end. The seat pan 44 may be pivotally coupled to the connecting plate 42 proximate the first end and may be slidably coupled to the mounting plate 40 proximate the second end. For instance, a fastener, such as a pin, may extend from the seat pan 44 and be received in the guide slot 62 to guide movement of the seat pan 44. The seat pan 44 may be disposed between the first and second side portions 50, 52 of the mounting plate 40 and may have an upper surface 76 that faces toward the cushion 34. As is best shown in FIG. 6, the upper surface 76 may include at least one adjustable support mechanism mounting feature 78 for coupling the adjustable support mechanism 36 to the seat pan 44 as will be discussed in more detail below.

The linkage mechanism 46 may couple the seat pan 44 to the seat back 22. The linkage mechanism 46 may actuate the connecting plate 42 and seat pan 44 when the seat back 22 moves between the unfolded and folded positions. As is best shown in FIGS. 5 and 6, a pair of linkage mechanisms 46 may extend along the first and second side portions 50, 52 of the mounting plate 40. The linkage mechanism 46 may include a first link 80, a second link 82, and a third link 84.

The first link 80 may be pivotally coupled to the seat pan 44 at a first end and may be pivotally coupled to the second link 82 at a second end. The first link 80 may extend along an inside surface of the flange 60 of a side portion 50, 52 in one or more embodiments.

The second link 82 may extend from the first link 80 to the third link 84. The second link may be pivotally coupled to the first link 80 at a first end and pivotally coupled to the third link 84 at a second end. The second link 82 may extend along an outside surface of a flange 60 and may be disposed opposite the first link 80 in one or more embodiments.

The third link 84 may extend from the second link 82 to the frame of the seat back 22. The third link 84 may be pivotally coupled to the second link 82 at a first end and may be disposed proximate the seat back 22 at a second end as will be discussed in more detail below.

A trim cover attachment member 48 may also be provided with the seat bottom frame 30. As is best shown in FIG. 5, the trim cover attachment member 48 may have a generally U-shaped configuration. The trim cover attachment member 48 may be fixedly coupled to the mounting plate 40 at first and second ends. The trim cover attachment member 48 may be at least partially spaced apart from the mounting plate 40 between the first and second ends such that one or more mounting clips may be installed to couple the trim cover assembly 28 to the trim cover attachment member 48.

Figure 2:
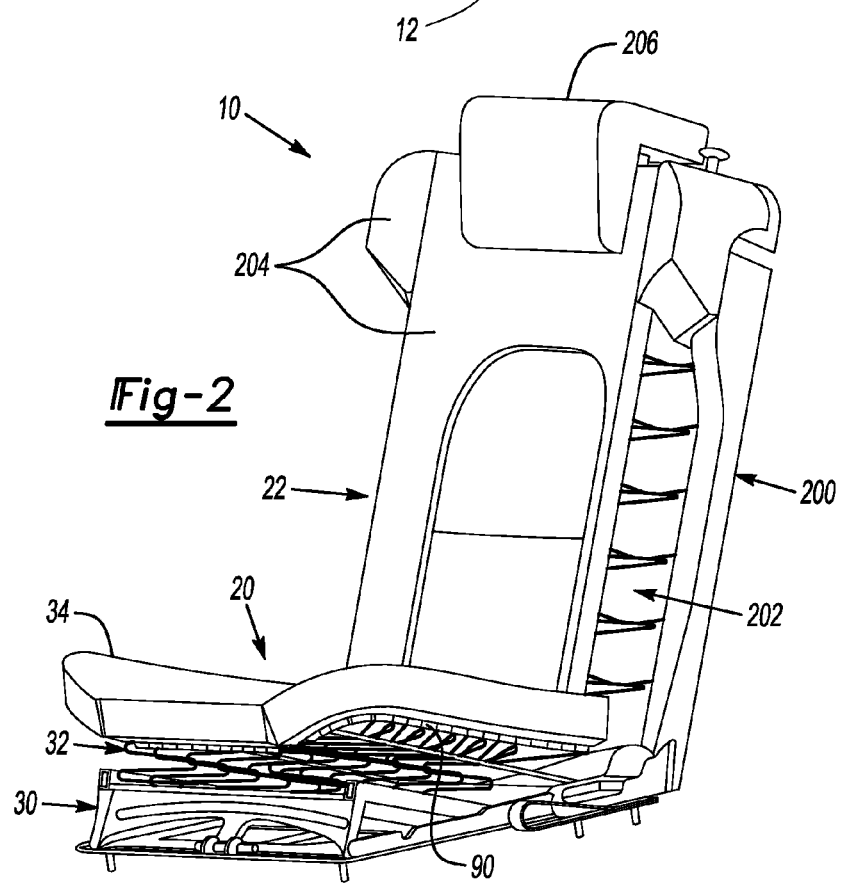
FIG. 2 is a perspective view of the seat assembly without a trim cover.
Figure 3:
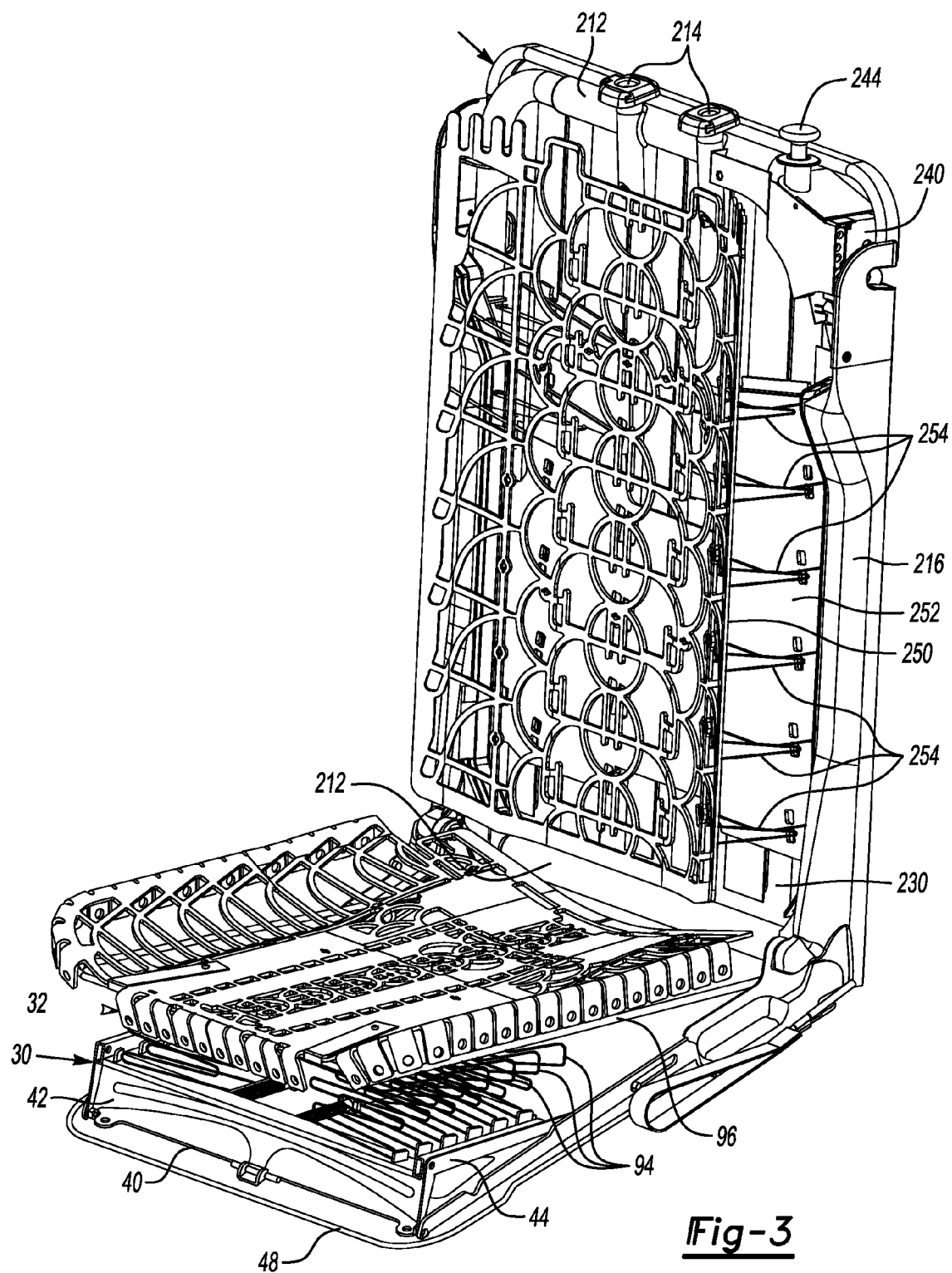
FIGS. 3-6 are perspective view of the seat assembly of FIG. 2 with additional components removed.
Figure 4:
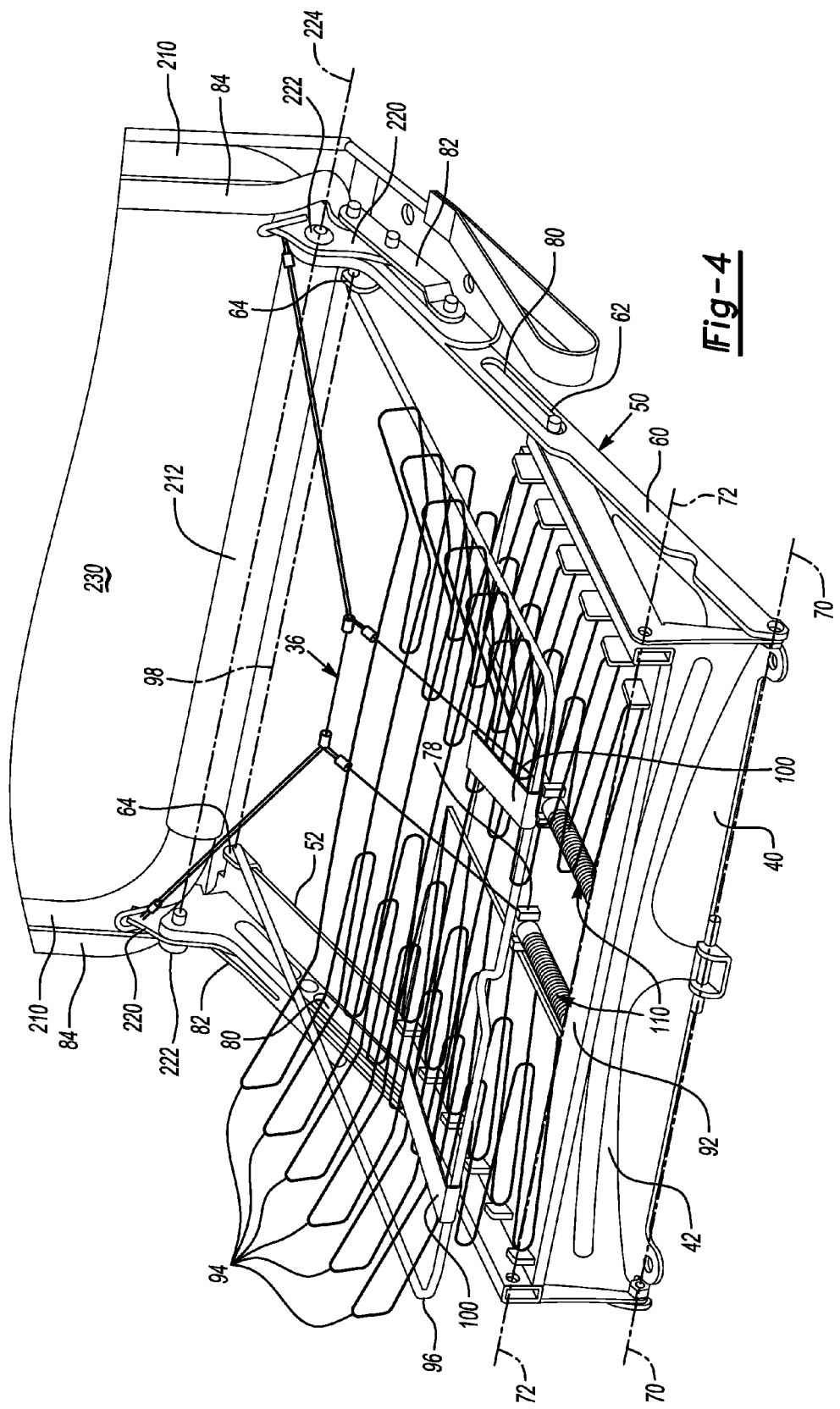

Referring to FIGS. 2-4, the collapsible cushion support assembly 32 is shown. The collapsible cushion support assembly 32 may be disposed on the seat bottom frame 30. The collapsible cushion support assembly 32 may support the cushion 34 and may move between an extended position (best shown in FIG. 8) and a collapsed position (best shown in FIG. 9) to facilitate storage. In at least one embodiment, the collapsible cushion support assembly 32 may include a first plate 90, a second plate 92, a set of spring members 94, and a pivot frame 96.

The first plate 90 may be disposed proximate the cushion 34. For example, the first plate 90 may engage a bottom surface of the cushion 34 and may be configured to flex when the seat back is moved to the folded position.

The second plate 92 may be spaced apart from the first plate 90 and may be disposed on the seat bottom frame 30. For example, the second plate 92 may be fixedly disposed on the seat pan 44. The second plate 92 may be fixedly disposed in any suitable manner, such as with one or more fasteners and/or tabs or hooks that inhibit movement with respect to the seat pan 44.

Figure 7:
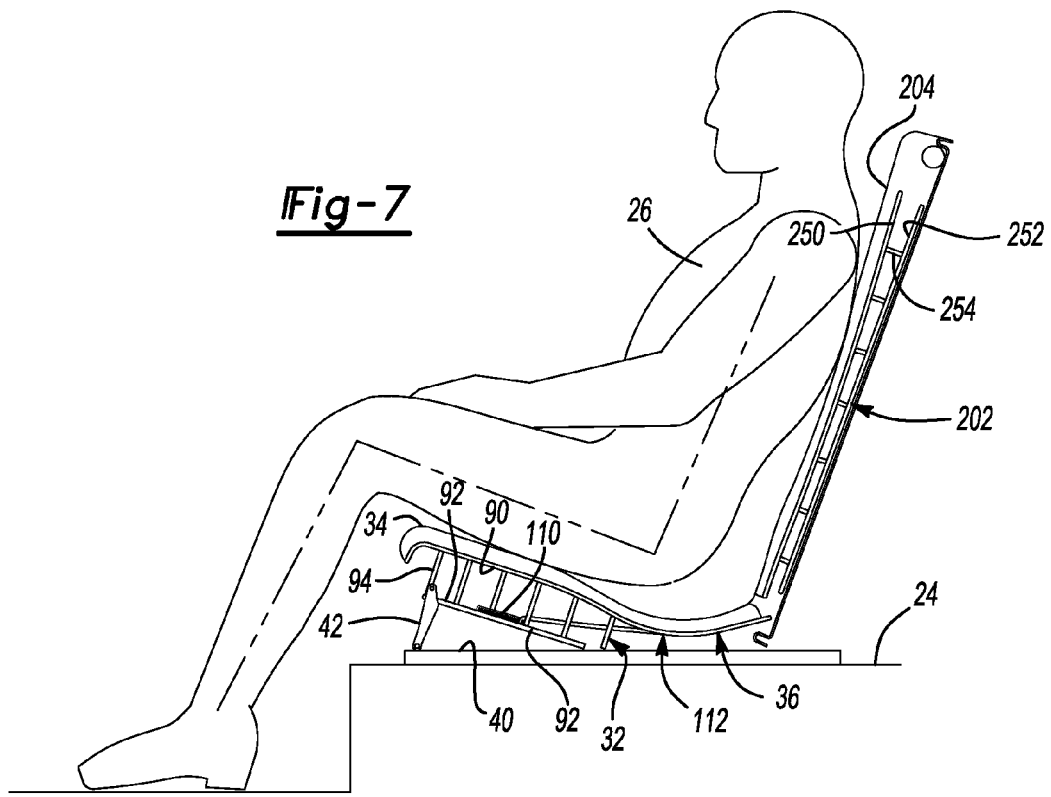
FIG. 7 is a simplified side view of the seat assembly supporting an occupant.
Figure 8:
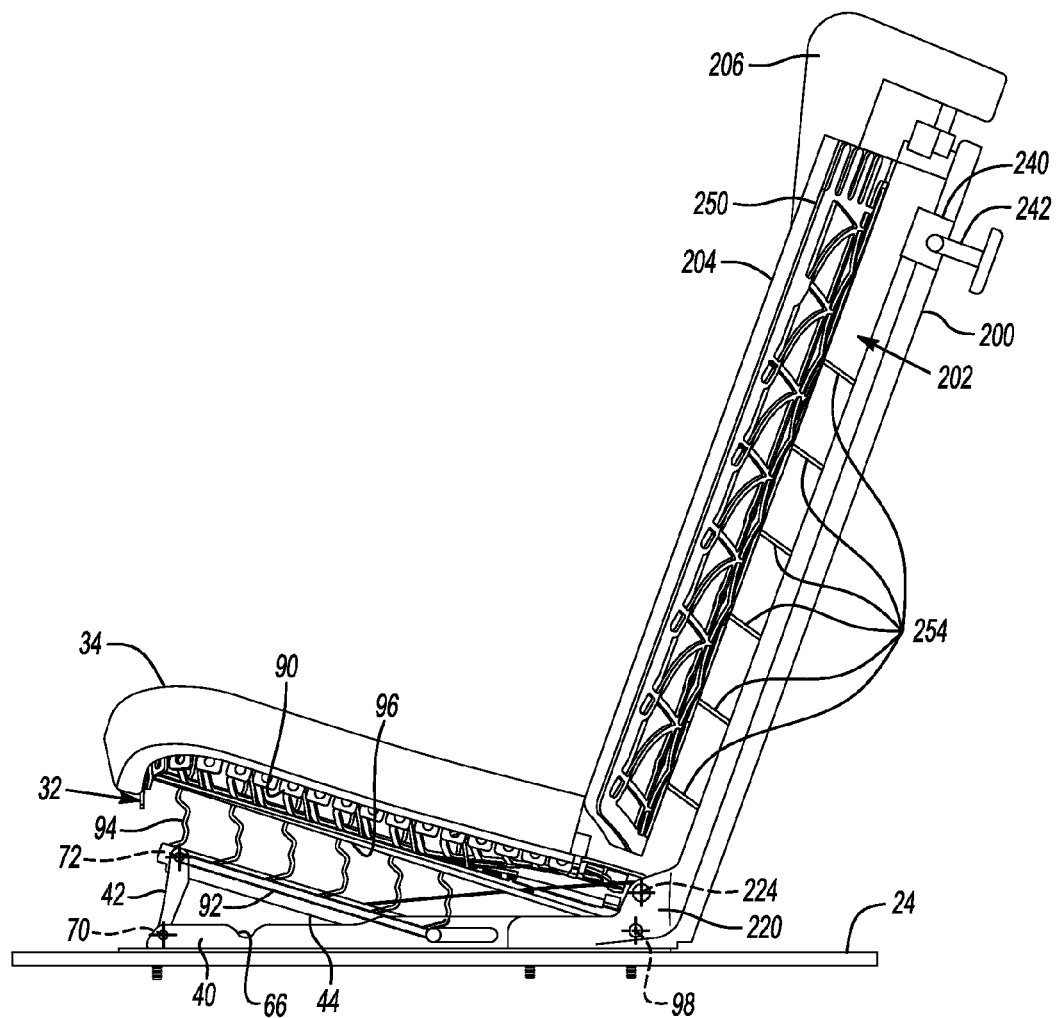
FIGS. 8 and 9 are side views of the seat assembly in exemplary unfolded and folded positions, respectively.

The set of spring members 94 may be disposed between and may be pivotally coupled to the first and second plates 90, 92. The spring members 94 may be configured as wires having a serpentine configuration in one or more embodiments. The spring members 94 may be pivotally coupled to the first and second plates 90, 92 in any suitable manner, such as with hog rings, clips, or the like. The spring members 94 may be spaced apart from each other and may extend substantially perpendicular manner to the first and/or second plates 90, 92 when the cushion support assembly 32 is in the extended position. The spring members 94 may also pivot in a common direction such that the spring members 94 may move closer together and overlap to allow the first plate 90 to move closer to the second plate 92. As is best shown in FIGS. 7 and 8, spring members 94 may not be provided under a region of the first plate 90 that is disposed near the seat back 22 or that is not disposed directly above the seat pan 44 to provide a more compact seat profile or reduced seat height when the seat assembly 10 is in the folded position.

Referring to FIGS. 3 and 4, the pivot frame 96 may connect the collapsible cushion support assembly 32 to the seat bottom frame 30. For example, the pivot frame 96 may extend between the first plate 90 and the seat bottom frame 30. In addition the pivot frame 96 may be disposed between the first plate 90 and the second plate 92 and may also be disposed under a portion of the spring members 94 such that the pivot frame 96 is located between the second plate 92 and the spring members 94. The pivot frame 96 may have a generally U-shaped configuration and may have a first end and a second end. The first and second ends may be received in pivot frame mounting features 64 on the first and second side portions 50, 52 of the mounting plate 40. As such, the pivot frame 96 may pivot about an axis 98 with respect to the mounting plate 40. The pivot frame 96 may be coupled to the collapsible cushion support assembly 32 between the first and second ends. For example, the pivot frame 96 may be coupled to the first plate 90 with a mounting bracket 100 and/or one or more fasteners, such as hog rings or clips. In addition, the pivot frame 96 may be movably coupled to at least one member of the set of spring members 94, such as with a fastener like a hog ring or clip.

Referring to FIG. 2, the cushion 34 may be disposed on the collapsible cushion support assembly 32. The cushion 34 may be disposed between and may engage the trim cover assembly 28 and the first plate 90. The cushion 34 may be made of any suitable material, such as foam.

Referring to FIGS. 4 and 5, the adjustable support mechanism 36 is shown in more detail. The adjustable support mechanism 36 may adjustably support a portion of the collapsible cushion support assembly 32 and/or cushion 34. For example, the adjustable support mechanism 36 may extend from the seat bottom frame 30 to a frame of the seat back 22. In addition, the adjustable support mechanism 36 may extend under the first plate 90 and a portion of the spring members 94. As such, the adjustable support mechanism 36 may support the first plate 90 and/or cushion 34 in an area of the collapsible cushion support assembly 32 that does not have spring members 94, such as the region of the first plate 90 that is disposed near the seat back 22. The adjustable support mechanism 36 may be configured to support at least a portion of the posterior or buttocks of a seat occupant 26 as is best shown in FIG. 7.

In at least one embodiment, the adjustable support mechanism 36 may include at least one biasing member 110 and a support member 112.

The biasing member 110 may be disposed on the seat bottom frame 30. For example, the biasing member 110 may be coupled to the seat pan 44 via the adjustable support mechanism mounting feature 78. The biasing member 110 may exert a biasing force on the support member 112. For example, the biasing member 110 may exert tension on the support member 112 when the seat assembly 10 is in the unfolded position to help support a seat occupant 26. Moreover, tension exerted by the biasing member 110 may inhibit the adjustable support mechanism 36 and/or first plate 90 from engaging the support surface 24, thereby providing clearance to provide better dampening or cushioning of a seat occupant 26 which may improve seating comfort. The tension exerted by the biasing member 110 may be reduced when the seat assembly 10 is folded toward the folded position.

In the embodiment shown, two biasing members 110 are provided that are spaced apart from each other. The biasing member 110 may include a spring 120 and a rod 122.

The spring 120 may be configured as a coil spring in one or more embodiments. The rod 122 may extend through an opening that may be defined by the coils of the spring 120. A first end of the rod 122 may be fixedly disposed on the spring 120 such that spring 120 may exert a biasing force on the rod 122. A second end of the rod 122 may be coupled to the support member 112.

The support member 112 may extend from the biasing member 110 to the frame of the seat back 22. The support member 112 may have any suitable configuration, such as a strap, wire, or the like. In at least one embodiment, the support member 112 may include a first linkage 130, a second linkage 132, and a third linkage 134. The first linkage 130 may have first and second ends that may be coupled to a frame of the seat back 22. The second linkage 132 may extend from the first linkage 130 to a first biasing member 110. Similarly, the third linkage 134 may extend from the first linkage 130 to a second biasing member 110. The second and third linkages 132, 134 may be coupled to the second end of the rod 122, if provided, and may be spaced apart from each other.

The adjustable support mechanism 36 as described above may be combined with or replaced by at least one stiffening spring that extends under the first plate 90 from the seat pan 44 to the seat back frame. In such an embodiment, the stiffening spring may be configured as one or more preformed strips of spring steel that may have one or more areas of curvature that exert a biasing force to support at least a portion of the posterior or buttocks of a seat occupant 26. As such, the stiffening spring may add stiffness to the total cushion suspension system in dynamic conditions just before the adjustable support mechanism 36 and/or first plate 90 may otherwise hit or engage the support surface 24.

Referring to FIGS. 2 and 3, the seat back 22 may include a seat back frame 200, a collapsible cushion support assembly 202, at least one cushion 204, and a head restraint 206.

The seat back frame 200 may provide at least a portion of a support structure for the seat back 22. In FIGS. 3 and 4, the seat back frame 200 is illustrated with a generally tubular configuration. The seat back frame 200 may include a pair of side members 210 and a pair of cross members 212. The cross members 212 may extend between and may interconnect the side members 210. In addition, one or more side members 210 may be integrally formed with one or more cross members 212. The cross member 212 disposed proximate the top of the seat back frame 200 may be provided with one or more guide sleeves 214 that may facilitate mounting of the head restraint 206. The head restraint 206 may be moveably disposed on the seat back 22 and configured to support the head of a seat occupant 26. One or more covers 216 may be provided with the seat back frame 200 to conceal components that may be coupled to the seat back frame 200. In FIG. 3, a pair of covers 216 is shown that extend generally along the side members 210.

The seat back frame 200 may also include a pair of mounting brackets 220 that facilitate mounting of the seat back 22 to the seat bottom 20. The mounting brackets 220 may be spaced apart from each other and may extend from the seat back frame 200. Each mounting bracket 220 may receive a fastener 222, such as a pin or bolt that pivotally couples the seat back 22 to the seat bottom 20. As such, the seat back 22 may pivot about an axis of rotation 224 that may extend through the fasteners 222. The axis of rotation 224 may be disposed above the axis 98. In addition, a portion of the adjustable support mechanism 36 may be coupled to the seat back frame 200. For example, the first linkage 130 of the support member 112 may be coupled to the mounting brackets 220.

A back plate 230 may be disposed proximate the seat back frame 200. The back plate 230 may be fixedly positioned on the seat back frame 200 and may facilitate mounting of the collapsible cushion support assembly 202.

Referring to FIGS. 3 and 8, the seat back frame 200 and vehicle 12 may optionally include a latch assembly 240 and a striker 242 that may cooperate to inhibit rotation of the seat back 22. The latch assembly 240 may be configured to selectively engage a striker 242 to inhibit pivoting of the seat back 22 and may be unlatched from and disengage the striker 242 to permit the seat back 22 to pivot about the axis of rotation 224. One or more release mechanisms 244 may be provided to actuate the latch assembly 240 from a latched condition to an unlatched condition. The latch assembly 240 may be disposed on the seat back frame 200 and the striker 242 may be disposed on the vehicle 12 or vice versa in one or more embodiments.

Referring to FIG. 3, the collapsible cushion support assembly 202 of the seat back 22 may have a similar configuration as the collapsible cushion support assembly 32 of the seat bottom 20. For example, the collapsible cushion support assembly 202 may include a first plate 250, a second plate 252, and a set of spring members 254 that are similar to the first plate 90, second plate 92, and set of spring members 94 of the collapsible cushion support assembly 32 of the seat bottom 20. The second plate 252 may be disposed on the back plate 230 and coupled to a second end of the third link 84. As such, the second plate 252 may move with respect to the seat back frame 200 when the seat back 22 is folded in one or more embodiments.

At least one cushion 204 may be provided with the seat back 22. In FIG. 2, one cushion 204 may be disposed on the first plate of the collapsible cushion support assembly 202. Optionally, another cushion 204 may be provided on seat back frame 200 adjacent to the collapsible cushion support assembly 202. For example, in FIG. 2 a second cushion 204 is provided near the top of the seat back 22. The cushions 204 may be at least partially concealed by and may engage the trim cover assembly 28 of the seat back 22.

Referring to FIG. 7, a simplified side view of the seat assembly 10 is shown. In FIG. 7, the force exerted by the seat occupant 26 may at least partially compress the spring members 94 of the collapsible cushion support assemblies 32, 202. The collapsible cushion support assembly 32 is positioned to support the thigh region of a seat occupant 26, while the adjustable support mechanism 36 is positioned to support the posterior of the seat occupant 26 and provide clearance from the support surface 24.

Referring to FIG. 8, the seat assembly 10 is shown in an exemplary unfolded position. In this position, the collapsible cushion support assemblies 32, 202 are in the extended position as previously discussed. In addition, the connecting plate 42 and seat pan 44 extend upwardly from the mounting plate 40 to tilt the seat bottom 20. More specifically, the connecting plate 42 is disposed at an angle with respect to the mounting plate 40 and extends toward the top of the seat bottom 20. The seat pan 44 also extends at an upward angle from the mounting plate 40 and may be disposed substantially parallel to a portion of the first plate 90. As such, the seat bottom 20 is disposed at an angle relative to the support surface 24 such that the front of the seat bottom 20 is disposed further from the support surface 24 than a rear portion of the seat bottom 20 that is disposed proximate the seat back 22. The pivot frame 96 may also extend at an upward angle from the mounting plate 40 and may extend generally parallel to the seat pan 44.

Referring to FIG. 9, the seat assembly 10 is shown in the folded position. In the folded position, the seat back 22 is pivoted about the axis of rotation 224 over the seat bottom 20, or in a counterclockwise direction from the perspective shown. Pivoting of the seat back 22 may be enabled by actuating the latch assembly 240 from a latched condition to an unlatched condition. Pivoting of the seat back 22 toward the folded position actuates the linkage mechanism 46. More specifically, rotation of the seat back 22 rotates the third link 84, which pulls the second and first links 82, 80 rearward. The direction of movement of the first and second links 80, 82 is constrained by the guide slot 62. As such, the first link 80 pulls the seat pan 44 rearward toward axis 98.

Movement of the seat pan 44 causes the connecting plate 42 to rotate about the first rotation axis 70 in a clockwise direction from the perspective shown. The seat pan 44 then rotates with respect to the connecting plate 42 about the second rotation axis 72. As such, the connecting plate 42 and seat pan 44 move downward toward the mounting plate 40. In addition, a pivot pin disposed along the second rotational axis 72 may be received in the notch 66.

Downward movement of the seat pan 44 lowers the second plate 92 toward the mounting plate 40. In addition, the pivot frame 96 to rotate about the axis 98 toward the mounting plate 40, or in a counterclockwise direction from the perspective shown. This rotation then causes the collapsible cushion support assembly 32 of the seat bottom 20 to move from the extended position to the collapsed position as the second plate 92 moves rearward with the seat pan 44 and the first plate 90 is inhibited from moving rearward by the pivot frame 96. The collapsible cushion support assembly 202 of the seat back 22 may also move from the extended position to the collapsed position in which the first plate 250 may fold or move away from the axis of rotation 224.

Downward movement of the seat pan 44 also causes the tension on the adjustable support mechanism 36 to decrease as the seat pan 44 moves closer to the seat back frame 200 and mounting brackets 220 to which the first linkage 130 may be coupled. In addition, the adjustable support mechanism 36 may move downward toward the mounting plate 40.

The movement of the components of the seat bottom 20 and seat back 22 may allow a seat assembly to be provided that may be folded to a thin profile for storage. For example, the height of the seat assembly 10 from the bottom of the seat bottom 20 to the back of the seat back 22 may be reduced to 90 mm or less in one or more embodiments.

The seat assembly 10 may be returned to the unfolded position by pivoting the seat back 22 away from the seat bottom 20. The collapsible cushion support assemblies 32, 202 may pivot from the collapsed position to the extended position. In addition, tension on the adjustable support mechanism 36 may increase when the seat back 22 is pivoted away from the seat bottom 20.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat bottom that includes:
      a cushion,
      a seat bottom frame, and
      a collapsible cushion support assembly disposed on the seat bottom frame that includes:
         a first plate that supports the cushion,
         a second plate disposed proximate the seat bottom frame, and
         a set of spring members that are disposed between and pivotally coupled to the first and second plates, wherein the set of spring members allow the collapsible cushion support assembly to move between an extended position and a collapsed position;
   a seat back that is configured to pivot with respect to the seat bottom, wherein the seat back has a seat back frame; and an adjustable support mechanism that supports the first plate and that extends from the seat bottom frame to the seat back frame, wherein the adjustable support mechanism includes a biasing member disposed on the seat bottom frame and a support member that extends from the biasing member to the seat back frame, wherein the biasing member exerts tension on the support member when the collapsible cushion support assembly is in the extended position and wherein the tension exerted by the biasing member is reduced when the seat back is folded toward the seat bottom.

2. The seat assembly of claim 1 wherein the adjustable support mechanism supports the first plate between the seat back and the set of spring members.

3. The seat assembly of claim 2 wherein the adjustable support mechanism extends underneath and engages the first plate between the set of spring members and the seat back.

4. The seat assembly of claim 1 wherein the seat bottom frame further comprises a seat pan, wherein the second plate is coupled to the seat pan.

5. The seat assembly of claim 1 wherein the tension exerted by the biasing member inhibits the support member from engaging a support surface upon which the seat assembly is disposed.

6. The seat assembly of claim 4 wherein the biasing member is disposed proximate the seat pan.

7. The seat assembly of claim 1 wherein the support member includes a first linkage that has first and second ends coupled to the seat back frame and a second linkage that has a first end coupled to the biasing member and a second end coupled to the first linkage.

8. The seat assembly of claim 7 further comprising a second biasing member that is coupled to the seat bottom frame and spaced apart from the biasing member and a third linkage that has a first end coupled to the second biasing member and a second end coupled to the first linkage.

9. The seat assembly of claim 8 wherein the first, second, and third linkages are wires.

10. The seat assembly of claim 1 wherein the first plate is disposed closer to the second plate in the collapsed position than in the extended position.

11. A seat assembly comprising:
a seat bottom that includes:
a cushion,
a seat bottom frame that includes:
a seat pan,
a mounting plate adapted to be mounted to a support surface, and
a connecting plate that is pivotally coupled to the seat pan and the mounting plate, and
a collapsible cushion support assembly disposed on the seat pan that includes:
a first plate disposed proximate the cushion,
a second plate coupled to the seat pan, and
a set of spring members that are disposed between and pivotally coupled to the first and second plates, wherein the set of spring members allow the collapsible cushion support assembly to move between an extended position and a collapsed position;
a seat back that is configured to pivot about an axis of rotation with respect to the seat bottom, wherein the seat back has a seat back frame; and
an adjustable support mechanism that supports the cushion and that extends from the seat pan to the seat back frame.

12. The seat assembly of claim 11 wherein the seat pan and the first plate move towards the mounting plate when the seat back is folded toward the seat bottom.

13. The seat assembly of claim 11 wherein the seat bottom frame further comprises a linkage mechanism that extends from the seat pan to the seat back frame, wherein folding of the seat back about the axis of rotation toward the seat bottom actuates the linkage mechanism and moves the seat pan and connecting plate toward the axis of rotation and the mounting plate.

14. The seat assembly of claim 11 wherein pivoting of the seat back about the axis of rotation toward the seat bottom moves the collapsible cushion support assembly from the extended position toward the collapsed position.

15. The seat assembly of claim 11 wherein the collapsible cushion support assembly further comprises a pivot frame that is pivotally coupled to the seat bottom frame and coupled to the first plate.

16. The seat assembly of claim 15 wherein the pivot frame pivots about an axis that is disposed below the axis of rotation.

17. The seat assembly of claim 15 wherein the pivot frame is disposed between the first and second plates.

18. A seat assembly comprising:
a seat bottom that includes:
a seat bottom frame, and
a collapsible cushion support assembly disposed on the seat bottom frame;
a seat back that is configured to pivot with respect to the seat bottom, wherein the seat back includes:
a seat back frame, and
a second collapsible cushion support assembly disposed on the seat back frame; and
an adjustable support mechanism that extends from the seat bottom frame to the seat back frame and supports the collapsible cushion support assembly, wherein the adjustable support mechanism includes a biasing member disposed on the seat bottom frame and a support member that extends from the biasing member to the seat back frame, wherein tension on the adjustable support mechanism increases when the seat back is pivoted away from the seat bottom and decreases when the seat back is pivoted toward the seat bottom.

19. The seat assembly of claim 18 wherein the collapsible cushion support assembly of the seat bottom is spaced apart from the second collapsible cushion support assembly.

20. The seat assembly of claim 18 wherein the seat back includes a latch assembly that is configured to engage a striker to inhibit pivoting of the seat back with respect to the seat bottom.

* * * * *